US008775545B1

(12) United States Patent
Eilam

(10) Patent No.: US 8,775,545 B1
(45) Date of Patent: Jul. 8, 2014

(54) IMAGE HOSTING FOR CROSS-PLATFORM DISPLAY OVER A COMMUNICATION NETWORK

(75) Inventor: Eldad Eilam, Santa Cruz, CA (US)

(73) Assignee: hop To Inc., Campbell, CA (US)

( * ) Notice: Subject to any disclaimer, the term of this patent is extended or adjusted under 35 U.S.C. 154(b) by 0 days.

(21) Appl. No.: 13/341,238

(22) Filed: Dec. 30, 2011

(51) Int. Cl.
*G06F 15/167* (2006.01)

(52) U.S. Cl.
USPC ........... 709/213; 709/214; 709/215; 709/217; 709/218; 709/219

(58) Field of Classification Search
USPC .................. 709/213, 214, 215, 217, 218, 219
See application file for complete search history.

(56) References Cited

U.S. PATENT DOCUMENTS

| | | | |
|---|---|---|---|
| 5,745,115 A | 4/1998 | Purple et al. | |
| 5,831,609 A | 11/1998 | London et al. | |
| 6,636,242 B2 | 10/2003 | Bowman-Amuah | |
| 6,710,786 B1 | 3/2004 | Jacobs et al. | |
| 6,758,394 B2 | 7/2004 | Maskatiya et al. | |
| 7,039,875 B2 | 5/2006 | Khalfay et al. | |
| 7,185,069 B2 | 2/2007 | Costin et al. | |
| 7,325,027 B2 | 1/2008 | Grown | |
| 7,418,472 B2 | 8/2008 | Shoemaker et al. | |
| 7,472,157 B2 | 12/2008 | Tolson et al. | |
| 7,631,328 B2 | 12/2009 | Clancy et al. | |
| 7,667,704 B2 | 2/2010 | Hogle | |
| 8,108,830 B2 | 1/2012 | Bibr et al. | |
| 8,583,627 B1 | 11/2013 | Kamvar et al. | |
| 2002/0196378 A1 | 12/2002 | Slobodin et al. | |
| 2003/0053091 A1 | 3/2003 | Tanaka et al. | |
| 2003/0069923 A1 | 4/2003 | Peart | |
| 2004/0177155 A1* | 9/2004 | Enokida et al. | 709/236 |
| 2004/0205715 A1 | 10/2004 | Taylor | |
| 2005/0080915 A1 | 4/2005 | Shoemaker et al. | |
| 2005/0198100 A1 | 9/2005 | Goring et al. | |
| 2006/0082581 A1 | 4/2006 | Schmieder et al. | |
| 2006/0082582 A1 | 4/2006 | Schmieder et al. | |
| 2006/0082583 A1 | 4/2006 | Leichtling et al. | |
| 2006/0085550 A1 | 4/2006 | Schmieder et al. | |
| 2006/0087512 A1 | 4/2006 | Schmieder et al. | |

(Continued)

FOREIGN PATENT DOCUMENTS

| | | |
|---|---|---|
| WO | WO 00/30729 | 6/2000 |
| WO | WO 2004/059938 | 7/2004 |

OTHER PUBLICATIONS

U.S. Appl. No. 13/341,754, Office Action dated Jul. 13, 2013.
U.S. Appl. No. 13/341,760 Office Action dated May 15, 2013.

(Continued)

*Primary Examiner* — Noel Beharry
*Assistant Examiner* — Abdelnabi Musa
(74) *Attorney, Agent, or Firm* — Lewis Roca Rothgerber LLP

(57) ABSTRACT

Data including information regarding a display of the host device may be received. A display of a client device may correspond to the display of the host device. Information regarding the display of the host device may be received and evaluated identify the images in the display. The identified images may be stored in memory and associated with a uniform resource locator (URL). A bitstream describing the display may be generated in which each image is referenced using the associated URL. The bitstream may then be provided to a client device, where rendering of the bitstream results in a display corresponding to the host device. Rendering the display may include retrieving the images associated with the URLs in the bitstream.

15 Claims, 2 Drawing Sheets

(56) References Cited

U.S. PATENT DOCUMENTS

| | | | |
|---|---|---|---|
| 2006/0149810 A1 | 7/2006 | Koo et al. | |
| 2006/0184982 A1 | 8/2006 | Paz et al. | |
| 2006/0195523 A1* | 8/2006 | Juang et al. | 709/204 |
| 2006/0225037 A1 | 10/2006 | Glein et al. | |
| 2006/0227141 A1 | 10/2006 | Hogle | |
| 2007/0005693 A1 | 1/2007 | Sampath et al. | |
| 2007/0229524 A1 | 10/2007 | Hendrey et al. | |
| 2008/0009344 A1 | 1/2008 | Graham et al. | |
| 2008/0016155 A1 | 1/2008 | Khalatian | |
| 2008/0034320 A1 | 2/2008 | Ben-Shachar et al. | |
| 2008/0082604 A1 | 4/2008 | Mansour et al. | |
| 2009/0100483 A1 | 4/2009 | McDowell | |
| 2009/0228779 A1 | 9/2009 | Williamson et al. | |
| 2009/0271501 A1 | 10/2009 | Shenfield et al. | |
| 2009/0292999 A1 | 11/2009 | LaBine et al. | |
| 2009/0320073 A1 | 12/2009 | Reisman | |
| 2010/0005396 A1 | 1/2010 | Nason et al. | |
| 2010/0111410 A1* | 5/2010 | Lu et al. | 382/166 |
| 2010/0118039 A1 | 5/2010 | Labour | |
| 2010/0279678 A1 | 11/2010 | Li et al. | |
| 2010/0281402 A1 | 11/2010 | Staikos et al. | |
| 2011/0032328 A1 | 2/2011 | Raveendran et al. | |
| 2011/0078532 A1 | 3/2011 | Vonog et al. | |
| 2011/0231782 A1* | 9/2011 | Rohrabaugh et al. | 715/760 |
| 2011/0239142 A1 | 9/2011 | Steeves et al. | |
| 2011/0283304 A1 | 11/2011 | Roberts et al. | |
| 2011/0299785 A1 | 12/2011 | Albu et al. | |
| 2012/0042275 A1 | 2/2012 | Neerudu et al. | |
| 2012/0084456 A1 | 4/2012 | Vonog et al. | |
| 2012/0093231 A1 | 4/2012 | Nozawa | |
| 2012/0102549 A1 | 4/2012 | Mazzaferri et al. | |
| 2012/0114233 A1 | 5/2012 | Gunatilake | |
| 2012/0117145 A1 | 5/2012 | Clift et al. | |
| 2012/0124497 A1 | 5/2012 | Kasoju et al. | |
| 2012/0166967 A1 | 6/2012 | Deimbacher et al. | |
| 2012/0214552 A1 | 8/2012 | Sirpal et al. | |
| 2012/0223884 A1 | 9/2012 | Bi et al. | |
| 2012/0254453 A1 | 10/2012 | Lejeune et al. | |
| 2012/0266079 A1 | 10/2012 | Lee et al. | |
| 2012/0299968 A1 | 11/2012 | Wong et al. | |
| 2012/0317295 A1 | 12/2012 | Baird et al. | |
| 2013/0019263 A1 | 1/2013 | Ferren et al. | |
| 2013/0124609 A1 | 5/2013 | Martinez et al. | |
| 2013/0194374 A1 | 8/2013 | Kieft et al. | |

OTHER PUBLICATIONS

U.S. Appl. No. 13/668,091 Office Action dated Apr. 23, 2013.
U.S. Appl. No. 13/670,163 Office Action dated May 7, 2013.
U.S. Appl. No. 13/668,095 Office Action dated Apr. 23, 2013.
Andujar, C.; Fairen, M.; Argelaguet, F., "A Cost-effective Approach for Developing Application-control GUIs for Virtual Environments," 3D User Interfaces, 2006. 3DUI 2006. IEEE Symposium on, vol., No., pp. 45,52, Mar. 25-29, 2006, doi:10.1109/VR.2006.6.
Borchers, J.; Ringel, M.; Tyler, J.; Fox, A., "Stanford interactive workspaces: a framework for physical and graphical user interface prototyping," Wireless Communications, IEEE, vol. 9, No. 6, pp. 64,69, Dec. 2002. doi: 10-1109/MWC.2002.1160083.
Boyaci, O.; Schulzrinne, Henning, "BASS Application Sharing System," Multimedia, 2008. ISM 2008. Tenth IEEE International Symposium on, vol., No., pp. 432,439, Dec. 15-17, 2008. doi:10.1109/ISM.2008.97.
Davidyuk, O., Georgantas, N., Issarny, V. & Riekki, J. (2009). MEDUSA: Middleware for End-User Composition of Ubiquitous Applications, In: Mastrogiovanni, F. & Chong, N.Y. (Eds.), Handbook of Research on Ambient Intelligence and Smart Environments: Trends and Perspectives. IGI Global, to appear. Retrieved from: http://www.mediateam.oulu.fi/public.
Fabio Paterno, Carmen Santoro, and Antonio Scorcia. 2008. Automatically adapting websites for mobile access through logical descriptions and dynamic analysis of interaction resources. In Proceedings of the working conference on Advanced visual interfaces (AVI'08). ACM, New York, NY, USA, 260-267. DOI=10.1145/1385569.1385611 http://doi.acm.org/10.
Giullo Mori, Fabio Paterno, and Carmen Santoro. 2003. Tool support for designing nomadic applications. In Proceedings of the 8th international conference on Intelligent user interfaces (IUI '03). ACM, New York, NY, USA, 141-148. DOI=10.1145/604045.604069 http://doi.acm.org/10.1145/604045.604069.
Giullo Mori, Fabio Paterno, and Carmen Santoro, "Design and development of multidevice user interfaces through multiple logical descriptions," IEEE Transactions on Software Engineering, vol. 30, No. 8, pp. 507-520, Aug. 2004. doi:10-1109/TSE.2004.40.
Huifeng Shen; Yan Lu; Feng Wu; Shipeng Li, "A high-performance remote computing platform," Pervasive Computing and Communications, 2009. PerCom 2009. IEEE International Conference on, vol., No., pp. 1,6, Mar. 9-13, 2009. doi:10.1109/PERCOM.2009.4912855.
Murielle Florins and Jean Vanderdonckt. 2004. Graceful degradation of user interfaces as a design method for multiplatform systems. In Proceedings of the 9th international conference on Intelligent user interfaces (IUI '04). ACM, New York, NY, USA, 140-147 DOI=10.1145/964442.964469 http://doi.acm.org/10.1145/964442.964469.
Nathalie Aquino, Jean Vanderonckt, and Oscar Pastor. 2010. Transformation templates: adding flexibility to model-driven engineering of user interfaces. In Proceedings of the 2010 ACM Symposium on Applied Computing (SAC '10). ACM, New York, NY, USA, 1195-1202. DOI=10.1145/1774088.1774340 http://doi.acm.org/10-1145/1774088.1774340.
Oleg Davidyuk, Ivan Sanchez, Jon Imanol Duran, and Jukka Riekki. 2008. Autonomic composition of ubiquitous multimedia applications in REACHES. In Proceedings of the 7th International Conference on Mobile and Ubiquitous Multimedia (MUM '08). ACM, New York, NY, USA. 105-108. DOI=10.1145/1543137.1543159 http://doi.acm.org/10.1145/1543137.1543159.
Xu Hu; Congfeng Jiang; Wei Zhang; Jilin Zhang; Ritai Yu; Changping Lv, "An Even Based GUI Programming Toolkit for Embedded System," Services Computing Conference (APSCC), 2010 IEEE Asia-Pacific, vol., No., pp. 625,631, Dec. 6-10, 2010. doi: 10-1109/APSCC.2010.115.
U.S. Appl. No. 13/341,207 Office Action mailed Nov. 18, 2013.
U.S. Appl. No. 13/341,754, Office Action dated Jan. 8, 2014.
U.S. Appl. No. 13/341,227 Office Action mailed Oct. 23, 2013.
U.S. Appl. No. 13/341,756 Office Action mailed Aug. 13, 2013.
U.S. Appl. No. 13/341,760 Office Action dated Nov. 20, 2013.
U.S. Appl. No. 13/490,329 Office Action mailed Jan. 15, 2014.
U.S. Appl. No. 13/490,330 Office Action mailed Dec. 17, 2013.
U.S. Appl. No. 13/475,916 Office Action dated Nov. 13, 2013
U.S. Appl. No. 13/475,917 Office Action dated Nov. 18, 2013.
U.S. Appl. No. 13/668,091 Final Office Action dated Nov. 6, 2013.
U.S. Appl. No. 13/670,163 Office Action dated Nov. 6, 2013.
U.S. Appl. No. 13/668,095 Office Action dated Nov. 5, 2013.
U.S. Appl. No. 13/831,782 Office Action dated Nov. 6, 2013.
U.S. Appl. No. 13/831,783 Final Office Action dated Dec. 17, 2013.
U.S. Appl. No. 13/831,783 Office Action dated Sep. 3, 2013.
U.S. Appl. No. 13/831,783 Office Action dated Sep. 4, 2013.
U.S. Appl. No. 13/341,207, filed Dec. 30, 2011, Eldad Eilam, Automatic Adjustment for Cross-Platform Display.
U.S. Appl. No. 13/341,432, filed Dec. 30, 2011, Eldad Eilam, Cloud Based Automatic Adjustment for Cross-Platform Display.
U.S. Appl. No. 13/341,215, filed Dec. 30, 2011, Eldad Eilam, Managing Text for Cross-Platform Display.
U.S. Appl. No. 13/341,750, filed Dec. 30, 2011, Eldad Eilam, Cloud-based Text Management for Cross-Platform Display.
U.S. Appl. No. 13/341,222, filed Dec. 30, 2011, Eldad Eilam, Change Detection for Cross-Platform Display.
U.S. Appl. No. 13/341,754, filed Dec. 30, 2011, Eldad Eilam, Cloud Based Change Detection for Cross-Platform Display.
U.S. Appl. No. 13/341,227, filed Dec. 30, 2011, Eldad Eilam, Motion Vectors for Cross-Platform Display.
U.S. Appl. No. 13/341,756, filed Dec. 30, 2011, Eldad Eilam, Cloud-Based Motion Vectors for Cross-Platform Display.
U.S. Appl. No. 13/341,232, filed Dec. 30, 2011, Eldad Eilam, Client Side Detection of Motion Vectors for Cross-Platform Display.

(56) References Cited

OTHER PUBLICATIONS

U.S. Appl. No. 13/341,760, filed Dec. 30, 2011, Eldad Eilam, Cloud-Based Image Hosting.
U.S. Appl. No. 13/341,425, filed Dec. 30, 2011, Eldad Eilam, Client Rendering.
U.S. Appl. No. 13/341,765, filed Dec. 30, 2011, Eldad Eilam, Cloud-Based Client Rendering.
U.S. Appl. No. 13/490,327, filed Jun. 6, 2012, Eldad Eilam, User Interface Management for Cross-Platform Display.
U.S. Appl. No. 13/490,329, filed Jun. 6, 2012, Eldad Eilam, User Interface Management for Cross-Platform Display.
U.S. Appl. No. 13/490,330, filed Jun.6, 2012, Eldad Eilam, Cloud-Based User Interface Management for Cross-Platform Display.
U.S. Appl. No. 13/475,911, filed May 18, 2012, Eldad Eilam, Facilitating Responsive Scrolling for Cross-Platform Display.
U.S. Appl. No. 13/475,912, filed May 18, 2012, Eldad Eilam, Facilitating Responsive Scrolling for Cross-Platform Display.
U.S. Appl. No. 13/475,913, filed May 18, 2012, Eldad Eilam, Cloud-Based Facilitation of Responsive Scrolling for Cross-Platform Display.
U.S. Appl. No. 13/475,916, filed May 18, 2012, Robert W. Currey, Decomposition and Recomposition for Cross-Platform Display.
U.S. Appl. No. 13/475,917, filed May 18, 2012, Robert W. Currey, Decomposition and Recomposition for Cross-Platform Display.
U.S. Appl. No. 13/475,918, filed May 18, 2012, Robert W. Currey, Cloud-Based Decomposition and Recomposition for Cross-Platform Display.
U.S. Appl. No. 13/341,091, filed Nov. 2, 2012, Eldad Eilam, Cross-Platform Video Display.
U.S. Appl. No. 13/670,163, filed Nov. 6, 2012, Eldad Eilam, Cross-Platform Video Display.
U.S. Appl. No. 13/668,095, filed Nov. 2, 2012, Eldad Eilam, Cloud-Based Cross- Platform Video Display.
U.S. Appl. No. 13/831,782, filed Mar. 15, 2013, CK Hsu, Using Split Windows for Cross-Platform Document Views.
U.S. Appl. No. 13/831,783, filed Mar. 15, 2013, CK Hsu, Using Split Windows for Cross-Platform Document Views.
U.S. Appl. No. 13/831,786, filed Mar. 15, 2013, CK Hsu, Cloud-Based Usage of Split Windows for Cross-Platform Document Views.
U.S. Appl. No. 13/341,222, Office Action mailed Jan. 27, 2014.
U.S. Appl. No. 13/341,756 Final Office Action mailed Feb. 4, 2014.
U.S. Appl. No. 13/341,232 Office Action mailed Mar. 10, 2014.
U.S. Appl. No. 13/341,425 Office Action mailed Mar. 5, 2014.
U.S. Appl. No. 13/341,765 Office Action mailed Feb. 7, 2014.
U.S. Appl. No. 13/490,327 Office Action mailed Jan. 28, 2014.
U.S. Appl. No. 13/475,916 Final Office Action mailed Mar. 12, 2014.
U.S. Appl. No. 13/475,917 Final Office Action mailed Mar. 12, 2014.
U.S. Appl. No. 13/831,782 Final Office Action mailed Feb. 24, 2014.
U.S. Appl. No. 13/341,432 Office Action mailed Mar. 24, 2014.
U.S. Appl. No. 13/341,215 Office Action mailed Mar. 21, 2014.
U.S. Appl. No. 13/341,750 Office Action mailed Apr. 16, 2014.
U.S. Appl. No. 13/341,754, Office Action mailed Apr. 16, 2014.
U.S. Appl. No. 13/341,227 Final Office Action mailed Apr. 18, 2014.
U.S. Appl. No. 13/475,918 Office Action mailed Mar. 12, 2014.
US 8,689,268, 04/2014, Eilam (withdrawn)

* cited by examiner

IMAGE HOSTING FOR CROSS-PLATFORM DISPLAY OVER A COMMUNICATION NETWORK

BACKGROUND

1. Field of the Invention

The present invention generally relates to cross-platform display. More specifically, the present invention relates to image hosting for cross-platform display.

2. Description of the Related Art

Individuals currently have a variety of options for communicating and carrying out transactions. Such options may include traditional desktop coming devices, as well as various mobile devices (e.g., mobile phones, smartphones, and tablets). In fact, many individuals may use multiple computing and mobile devices at home, work, and on the move. For example, an individual may use a desktop computer at work, a laptop computer at home, and one or more mobile devices (e.g., smartphone, tablet) elsewhere. As such, people have come to expect to be able to have access to data and computing resources so to perform most computing tasks anywhere.

One difficulty in meeting such an expectation is that the various computing devices may not all have the same capabilities. For example, such devices may run different operating systems/platforms and applications. Such differences may make it difficult to support the same tasks across such devices. One solution has been to provide remote desktops where a first device runs the applications and a second device receives the visual display that appears on the first device over a communication network (e.g., Internet). Such remote desktops can allow users to access and control resources and data on the first device at a remote location using a second (e.g., portable) device.

One drawback to such an approach arises from the fact that such devices are generally used differently, so applications may be optimized for one type of device, but not another. For example, the different devices may have different sizes and input options (e.g., keyboard, keypad, touchscreen). The display of one device may not be optimized for a second device. For example, if a desktop computer display is shrunk to fit on a smartphone screen, the shrunken size may be difficult for the user to read or discern what is being displayed. Alternatively, if the display is not shrunken, the smartphone may only be able to display a portion of the original display at a time, which also adds to the difficulty in reading and discerning what is being displayed. While some devices allow for manual adjustment of the display by the user, changing displays and images may require the user to continually re-adjust the display, which may be unwieldy and inconvenient. Additionally, using a finger on a touchscreen does not provide input as accurately as, for example, a mouse or physical keyboard. This difficulty is further heightened where the device lacks a tactile keyboard and instead relies on a keyboard display on a touchscreen. The size of the screen portion for display is further constrained when a keyboard is activated.

An additional complication is that some devices (e.g., mobile devices) may not have the same processing power or speed as other devices. For powerful devices, rendering complex displays may not be a problem. For less powerful devices, it may take a much longer time. This problem is further heightened where displays are continually changing (e.g., video).

Generally, host-rendered displays allow for an image to be rendered on a host device, processed (e.g., compressed), and then delivered to the client. In client-rendered displays, client devices are sent instructions for rendering a display. Some models rely on a combination of host- and client-rendering. For one particular type of display/changes, namely video displays, video codecs are components that compress or decompress video data based on various algorithms.

There is, therefore, a need in the art for improved systems and methods of image hosting for cross-platform display.

SUMMARY OF THE CLAIMED INVENTION

Embodiments of the present invention include systems and methods of image hosting for cross-platform display. Data including information regarding a display of the host device may be received. Information regarding the display of the host device may be received and evaluated identify the images in the display. The identified images may be stored in memory and associated with a uniform resource locator (URL). A bitstream describing the display may be generated in which each image is referenced using the associated URL. The bitstream may then be provided to a client device, where rendering of the bitstream results in a display corresponding to the host device. Rendering the display may include retrieving the images associated with the URLs in the bitstream.

Various embodiments of the present invention include methods of image hosting for cross-platform display. Such methods may include receiving data sent over a communication network, the data including information regarding a display of a host device, identifying one or more images included in the display of the host device, providing the one or more images to memory for storage, associating each of the one or more images with a uniform resource locator (URL), and generating a bitstream regarding the display of the host device that references the one or more images using the one or more URLs associated with the stored images; and providing the bitstream to the client device for rendering the bitstream by retrieving the images associated with the URLs and stored in memory Embodiments of the present invention may further include systems of image hosting for cross-platform display. Such systems may include a host device and a client device with a display that corresponds to a display of a host device. Some embodiments may additionally include an intermediary device, such as a server. Either the host device or server may evaluate the host device display to identify any images, store the images in memory, associate the images with URLs, generate a bitstream to describe the host device display that uses the URLs to refer to the images, and provide the bitstream to the client device for rendering, which includes retrieving the stored images associated with the URLs.

Other embodiments of the present invention include non-transitory computer-readable storage media on which is embodied instructions executable to perform a method of image hosting for cross-platform display as previously set forth above.

DETAILED DESCRIPTION

Figure 1:
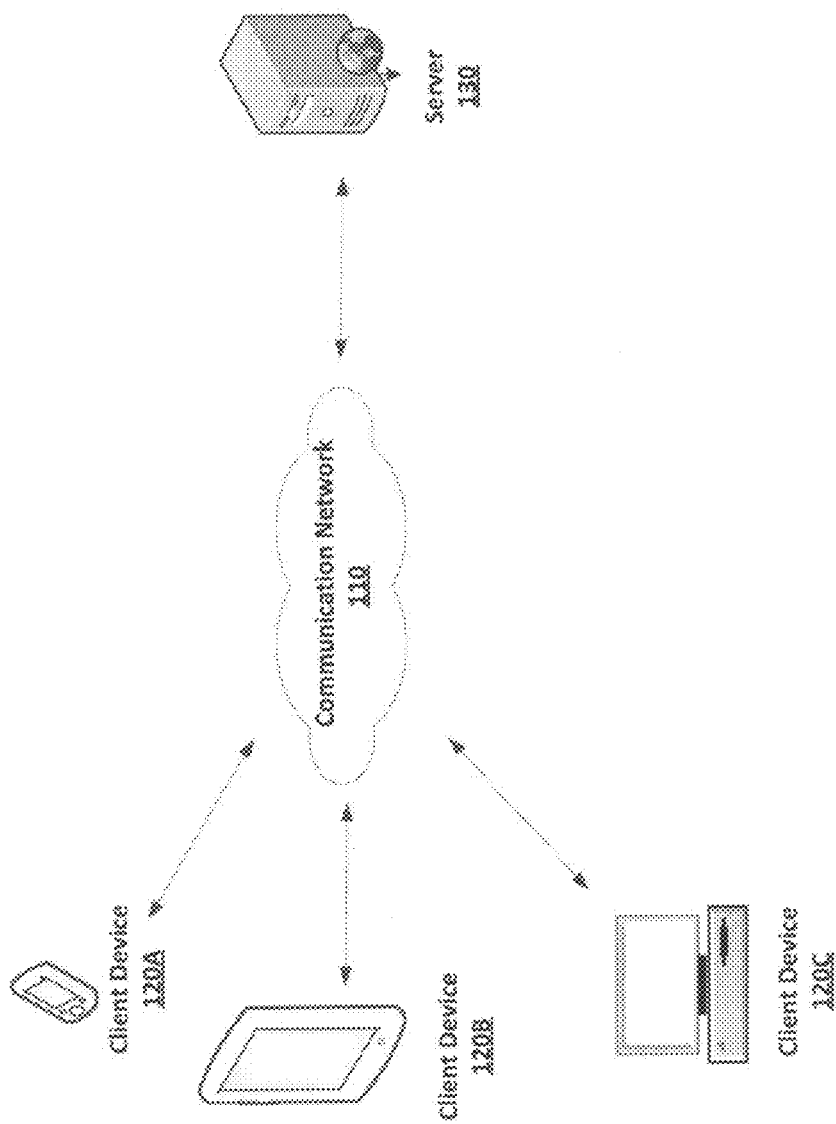
FIG. 1 illustrates a network environment in which an exemplary system of image hosting for cross-platform display may be implemented.

Image hosting for cross-platform display is provided. Data including information regarding a display of the host device may be received. Information regarding the display of the host device may be received and evaluated identify the images in the display. The identified images may be stored in memory and associated with a uniform resource locator (URL). A bitstream describing the display may be generated in which each image is described by reference to the associated URL. The bitstream may then be provided to a client device, where rendering of the bitstream results in a display corresponding to the host device. Rendering the display may include retrieving the images associated with the URLs in the bitstream FIG. 1 illustrates a network environment 100 in which a system for image hosting for cross-platform display may be implemented. Network environment 100 may include a communication network 110, one or more user devices 120A-C, and a server 130. Devices in network environment 100 may communicate with each other via communications network 110.

Communication network 110 may be a local, proprietary network (e.g., an intranet) and/or may be a part of a larger wide-area network (e.g., the cloud). The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of network environment 100.

Users may use any number of different electronic client devices 120A-C, such as general purpose computers, mobile phones, smartphones, personal digital assistants (PDAs), portable computing devices (e.g., laptop, netbook, tablets), desktop computing devices, handheld computing device, or any other type of computing device capable of communicating over communication network 110. Client devices 120 may also be configured to access data from other storage media, such as memory cards or disk drives as may be appropriate in the case of downloaded services. Client device 120 may include standard hardware computing components such as network and media interfaces, non-transitory computer-readable storage (memory), and processors for executing instructions that may be stored in memory.

Client device 120A is illustrated as a mobile phone or smartphone, while client device 120B is illustrated as a tablet computing device and client device 120C is illustrated as a desktop device. As can be seen, each client device 120 is sized differently and/or has different input options. Exemplary embodiments of the present invention allow for tasks and applications that are specific to one client device 120 (e.g., operating in a Microsoft Windows® environment) to be used and optimized for another client device 120 (e.g., operating in an Apple iOS® environment).

A client device 120 may include a client application, a client 3D library, and a client display driver. Collectively, these elements may enable the client and the client user to consume computer graphics resources or services provided by server 110.

Server 130 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Server 130 may associated with the same user and located in the same local network as client device 120C. Alternatively, server 130 may be located remotely (e.g., in the cloud) and may be associated with a third party that provides services in accordance with embodiments of the present invention. In some instances, the services may be provided via software (e.g., mobile application, software as a service) downloaded from server 130 to one or more client devices 120. Updated software may similarly be downloaded as the updates become available or as needed.

Server application may represent an application executing ("running") on server 130. The functionality of server application may be visible to and accessible by client 120 via application publishing over the cloud (e.g., communication network 110), such as that supported by GraphOn GO-Global, Microsoft Remote Desktop Services, and Citrix XenApp. Examples of server application 132 may include a computer-aided design (CAD) application, such as AutoCAD® (by Autodesk, Inc. of San Rafael, Calif.) or Cadence Virtuoso (by Cadence Design Systems of San Jose, Calif.), a medical clinical workflow application such as Symbia.net (by Siemens AG of Munich, Germany), an interactive mapping application such as Google Earth (by Google, Inc of Mountain View, Calif.), or a 3D game.

Figure 2:
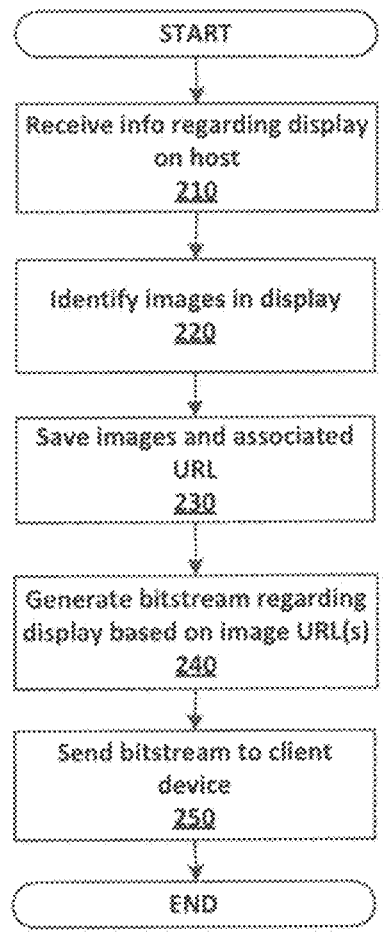
FIG. 2 is a flowchart illustrating an exemplary method of image hosting for cross-platform display.

FIG. 2 illustrates a method 200 for image hosting for cross-platform display. The method 200 of FIG. 2 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 2 (and the order thereof) are exemplary and may include various alternatives, equivalents, or derivations thereof including but not limited to the order of execution of the same.

In method 200 of FIG. 2, information regarding a display of a host device (e.g., device 120C) is received and analyzed to identify any images in the display. Each identified image is stored in memory and associated with a URL. A bitstream describing the host device display may be generated. Description of the image includes referencing the associated URL. The bitstream may be sent to the client device (e.g., device 120A), which renders the display described by the bitstream. Rendering may include retrieving the images stored in memory and associated with the URLs.

In step 210, information regarding a display of a host device 120C may be received for processing prior to rendering by client device 120A. In some instances, the user may wish for client device 120A to include a display corresponding to that of the host device 120C. Some types of applications may be associated with a visual, graphical display. A host device 120C running such applications may generate a display to appear on a screen associated with the host device 120C. Information regarding the display may be indicative of what needs to be displayed (e.g., images, text, and video). Such information may additionally indicate where an image or text appears on the screen.

In step 220, images in the host device display are identified. The images may be identified as a type of file (having a file extension) known in the art to be an image (e.g., bmp, jpg, png). Alternatively, the display may be broken down into portions (or set of pixels) 6such that each portion may be considered an image. Combinations of the foregoing may also be used.

In step 230, the images are stored in memory of a web-hosting device and associated with a uniform resource locator (URL) identifying the location where the images are stored. The web-hosting device may be the server 130 or another device associated with a service provider of web-hosting services. The images may be encoded prior to storage and hosting. Such encoding may be based on a compression codec that is compatible with a browser associated with client device 120A. For example, for an Apple iPhone®, an image may be encoded using a code that is compatible with Safari. A URL is assigned to each image; the URL may be used to retrieve the associated image that is stored at the identified location (e.g., at the web-host).

In step 240, a bitstream is generated regarding the display of the host device 120C using the URLs to refer to the associated images. Because a particular image file may be quite large (depending on type, resolution, quality), using a URL to link to an image rather than providing the image itself may reduce the amount of data required to describe a display including one or more images. Moreover, some images (e.g., 3D graphics) in the display of host device 120C may not be compatible with or easily processed by client device 120A. Prior art solutions, for example, may include sending images with Javascript commands for rendering the same. In contrast, step 240 involves leveraging internet browser capabilities for rendering graphics by ensuring that the bitstream sent to client device 120A includes URL links to images that are already encoded for the internet browser associated with the client device 120A.

In step 250, the bitstream is provided to the client device 120A (e.g., its internet browser) for processing and rendering. The bitstream provides information to client device 120A on how to render a display that corresponds to the display of the host device 120C. Instead of receiving images, however, the client device 120A receives URLs, which can be used (e.g., by the internet browser on the client device 120A) to retrieve the images. The retrieved images can be rendered on the display of the client device 120A using the graphics and rendering capabilities of the internet browser. As such, the client device 120A may generate a display that corresponds to that of the host device 120C in an efficient manner despite having different (e.g., less) processing resources.

Various embodiments of the present invention allow for the method 200 to be performed by an intermediary device (e.g., server 130) which may be associated with the host device or reside elsewhere in the network (e.g., in the cloud). For example, server 130 (or proxy device) may receive information regarding what the host device 120C is currently displaying. The server 130 may provide information to client device 120A so that client device 120A can generate a corresponding display. Server 130 may additionally monitor host device 120C, identify images in the display, provide to a web-host in association with a URL, generate a bitstream incorporating the URLs in place of the actual images (and image rendering commands), and provide the bitstream to client device 120A for processing.

Alternatively, software located at host device 120C may receive information regarding the display, identify images in the display, store the images on a web-hosting device, associate each stored image with a URL, generate a bitstream regarding the host device display, and provide the bitstream to the client device 120A such that the client device 120A can use its internet browser capabilities to retrieve and render the linked images.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the invention as defined by the appended claims and otherwise appreciated by one of ordinary skill in the art. The scope of the invention should, therefore, be determined not with reference to the above description, but instead should be determined with reference to the appended claims along with their full scope of equivalents.

What is claimed is:

1. A method for image hosting for cross-platform display, the method comprising:

receiving data sent over a communication network from a remote host device, the received data including information regarding a display of the host device to be processed prior to rendering by an identified remote client device having one or more identified browsers, wherein the display of the host device includes a plurality of types of data, wherein at least one type is image data;

executing instructions stored in memory, wherein execution of instructions by a processor:
identifies one or more images included in the image data from the plurality of data types in the display of the host device,
provides each of the identified one or more images in the received image data to memory for storage, wherein each image is encoded in a manner compatible with an identified browser of the identified client device prior to storage,
automatically assigns a uniform resource locator (URL) to each image encoded for the identified browser of the identified client device, each URL identifying a location where the associated image is stored for access by the identified browser of the identified client device, and generates a bitstream regarding the display of the host device, wherein the bitstream refers to the one or more URLs associated with the stored images that have been encoded for the identified browser of the identified client device; and providing the bitstream to the identified client device, wherein rendering the bitstream comprises using the identified browser of the client device to retrieve the images associated with the URLs and stored in memory.

2. The method of claim 1, wherein the bitstream further includes information regarding where each data type appears in the display of the host device.

3. The method of claim 1, wherein identifying the images in the display of the host device comprises identifying a file name with a file extension associated with image data.

4. The method of claim 1, wherein identifying the image in the display of the host device comprises selecting a set of pixels and saving the set of pixels as an image.

5. The method of claim 1, further comprising maintaining information regarding graphics processing ability of the browser of the client device, wherein the maintained information is used to encode the identified images.

6. A system for image hosting for cross-platform display, the system comprising:

a communication interface for receiving data sent over a communication network from a remote host device, the data including information regarding a display of a host device to be processed prior to rendering by an identified remote client device having or more identified browsers, wherein the display of the host device includes a plurality of types of data, wherein at least one type is image data; and a processor for executing instructions stored in memory, wherein execution of instructions by the processor:

identifies one or more images included in the image data from the plurality of data types in the display of the host device, provides each of the identified one or more images in the received image data to memory for storage, wherein each image is encoded in a manner compatible with an identified browser of the identified client device prior to storage, automatically assigns a uniform resource locator (URL) to each image encoded for the identified browser of the identified client device, each URL identifying a location where the associated image is stored for access by the identified browser of the identified client device, and generates a bitstream regarding the display of the host device, wherein the bitstream refers to the one or more URLs associated with the stored images that have been encoded for the identified browser of the identified client device; and wherein the communication interface provides the bitstream to the identified client device, wherein rendering the bitstream comprises using the identified browser of the client device to retrieve the images associated with the URLs and stored in memory.

7. The system of claim 6, wherein the bitstream further includes information regarding where each data type appears in the display of the host device.

8. The system of claim 6, wherein identifying the images in the display of the host device comprises identifying a file name with a file extension associated with image data.

9. The system of claim 6, wherein identifying the image in the display of the host device comprises selecting a set of pixels and saving the set of pixels as an image.

10. The system of claim 6, further comprising memory for maintaining information regarding graphics processing ability of the browser of the client device, wherein the maintained information is used to encode the identified images.

11. A non-transitory computer-readable storage medium, having embodied thereon a program executable by a processor to perform a method for image hosting for cross-platform display, the method comprising:

receiving data sent over a communication network from a remote host device, the received data including information regarding a display of the host device to be processed prior to rendering by an identified remote client device having one or more identified browsers, wherein the display of the host device includes a plurality of types of data, wherein at least one type is image data; and identifying one or more images included in the image data from the plurality of data types in the display of the host device;

providing each of the identified one or more images in the image data to memory for storage, wherein each image is encoded in a manner compatible with an identified browser of the identified client device prior to storage;

automatically assigning a uniform resource locator (URL) to each of the one or more images encoded for the identified browser of the identified client device, each URL identifying a location where the associated image is stored for access by the identified browser of the identified client device; and generating a bitstream regarding the display of the host device, wherein the bitstream refers to the one or more URLs associated with the stored images; and providing the bitstream to the identified client device, wherein rendering the bitstream comprises using the identified browser of the client device to retrieve the images associated with the URLs and stored in memory.

12. The non-transitory computer-readable storage medium of claim 11, wherein the bitstream further includes information regarding where each data type appears in the display of the host device.

13. The non-transitory computer-readable storage medium of claim 11, wherein identifying the images in the display of the host device comprises identifying a file name with a file extension associated with image data.

14. The non-transitory computer-readable storage medium of claim 11, wherein identifying the image in the display of the host device comprises selecting a set of pixels and saving the set of pixels as an image.

15. The non-transitory computer-readable storage medium of claim 11, wherein the program further comprises executable instructions for maintaining information regarding graphics processing ability of the browser of the client device, wherein the maintained information is used to encode the identified images.

* * * * *